US008166512B2

(12) United States Patent
Hwang

(10) Patent No.: US 8,166,512 B2
(45) Date of Patent: Apr. 24, 2012

(54) DIGITAL BROADCAST TERMINAL EQUIPPED WITH BROADCAST PROGRAM INFORMATION ROAMING FUNCTION AND ROAMING METHOD USING THE SAME

(75) Inventor: Jae Moon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 11/554,256

(22) Filed: Oct. 30, 2006

(65) Prior Publication Data

US 2007/0101391 A1 May 3, 2007

(30) Foreign Application Priority Data

Oct. 28, 2005 (KR) ........................ 10-2005-0102344

(51) Int. Cl.
*H04N 7/173* (2011.01)

(52) U.S. Cl. ........................................................ 725/131

(58) Field of Classification Search ......................... None
See application file for complete search history.

(56) References Cited

U.S. PATENT DOCUMENTS 7,076,202 B1 * 7/2006 Billmaier ..................... 455/3.04
7,346,635 B2 * 3/2008 Whitten et al. ............... 707/204
2003/0088420 A1 * 5/2003 alSafadi et al. ............ 704/270.1
2004/0131076 A1 * 7/2004 Smith ........................... 370/432
2004/0154039 A1 * 8/2004 Simms et al. ................... 725/39
2006/0225093 A1 * 10/2006 Huttunen et al. ............... 725/39
2006/0271566 A1 * 11/2006 Mathias ........................ 707/100

FOREIGN PATENT DOCUMENTS

CN 1526235 1/2004
EP 1 450 562 A2 8/2004
JP 2002057645 2/2002
JP 2004536510 12/2004
KR 10-2005-0066234 6/2005
KR 10-2006-0005260 1/2006
WO WO 03/007596 A1 1/2003
WO WO 03007596 A1 * 1/2003
WO WO 2005/015913 A1 2/2005

* cited by examiner

*Primary Examiner* — Dominic D Saltarelli
*Assistant Examiner* — Alfonso Castro
(74) *Attorney, Agent, or Firm* — Lee, Hong, Degerman, Kang & Waimey

(57) ABSTRACT

A mobile communication terminal equipped with a broadcast program information roaming function and a roaming method for use in the same are disclosed. The mobile communication terminal equipped with a broadcast program information roaming function includes: a Radio Frequency (RF) receiver for receiving information of a metadata interface for broadcast program information conversion from a broadcast program information mapping service provider, and receiving broadcast program information from a broadcast transmitter; a memory for storing the information of the metadata interface for the broadcast program information conversion; and a controller for analyzing the received broadcast program information, and converting the broadcast program information into a schema of a roaming region using the metadata interface for the broadcast program information conversion.

14 Claims, 5 Drawing Sheets

DIGITAL BROADCAST TERMINAL EQUIPPED WITH BROADCAST PROGRAM INFORMATION ROAMING FUNCTION AND ROAMING METHOD USING THE SAME

CROSS REFERENCE TO RELATED APPLICATION

This application claims the benefit of Korean Patent Application No. 10-2005-0102344, filed on Oct. 28, 2005, which is hereby incorporated by reference as if fully set forth herein.

BACKGROUND OF THE INVENTION

1. Field of the Invention

The present invention relates to a mobile communication terminal capable of receiving digital broadcast data, and more particularly to a mobile communication terminal for performing a roaming function using broadcast program information metadata interface, and a roaming method using the same.

2. Discussion of the Related Art

Broadcast program information is required for providing a user with digital broadcast data called representative digital multimedia content data. There are many types of broadcast program information in a digital multimedia broadcasting field, such as an Electronic Program Guide (EPG).

The EPG is indicative of a service information (SI) in which information related to channel, timetable, and title of broadcast data is described. A conventional EPG includes different broadcast service formats according to broadcast enterprises and broadcast categories.

Most broadcast terminals have different EPG provision methods. In other words, most broadcast terminals have different EPG processing methods and different expressing engines. Consequently, there is a limitation in employing the EPG information having different broadcast formats. The EPG information is located under a broadcast service. The user uses the EPG information via interfaces of individual broadcast services.

The EPG information has different structures according to broadcast enterprises and broadcast services. For example, a Terrestrial Digital Multimedia Broadcasting (T-DMB) system has a specific structure capable of transmitting EPG data over a network of a mobile communication enterprise without using an additional channel for EPG transmission.

A Satellite Digital Multimedia Broadcasting (S-DMB) system has a specific structure capable of transmitting EPG data over a broadcast channel. Therefore, the T-DMB system and the S-DMB system have transmission formats different from each other.

In the current system, different types of receivers are available each broadcast types, and at the same time, various types are being developed to support the different types of broadcast type. Individual demultiplexers receive broadcast signal streams from tuners/demodulators based on a variety of schemes, and filter the received broadcast signal streams while being classified according to sections. Thereafter, each demultiplexer extracts SI (Service Information) data. Each controller analyzes table syntax using the same format, and configures an integrated EPG database (DB) to be stored in a memory. The integrated EPG DB is provided to a user as an On Screen Display (OSD) signal. The conventional art capable of storing the EPG data depending on individual broadcast enterprises and individual broadcast formats as an integrated DB must convert a current EPG-data structure received from the broadcast enterprise into another EPG-data structure in order to store different EPG data as integrated EPG data.

A current EPG is converted into another EPG data to be suitable for a broadcast service environment based on broadcast enterprises, and is being provided to users.

Although a mobile communication terminal provides the users with a single EPG usage environment corresponding to a broadcast system, it has a disadvantage in that it must change an EPG-data storage structure to another storage structure in order to store an integrated EPG DB based on different structures. Since the integrated EPG DB is integrated data resulting from the structure change, it has difficulty in coping with new broadcast environment standards if metadata interface is changed to another data.

Presently, a variety of EPG data for every country, enterprise, and region are being widely used throughout the world, and different standards and transmission methods are also being used for individual EPG data depending on the individual countries, enterprises, and regions. Therefore, if a broadcast terminal moves from a current location to another location, a global roaming service is required. A roaming structure of the EPG data is depicted in FIG. 1.

SUMMARY OF THE INVENTION

Accordingly, the present invention is directed to a digital broadcast terminal equipped with an EPG roaming function and a roaming method for use in the same, that substantially obviate one or more problems due to limitations and disadvantages of the related art.

An object of the present invention is to provide a digital broadcast terminal for roaming with EPG data of a second region when a user who carries the digital broadcast terminal moves from a first region to the second region, which has an EPG schema structure is different from that of the first region, and a roaming method for use in the same.

Another object of the present invention is to provide a digital broadcast terminal capable of performing a roaming function without changing an amount of data depending upon the conversion of EPG data, and a roaming method for use in the same.

Yet another object of the present invention is to provide a digital broadcast terminal capable of mapping EPG data based on different languages, and a roaming method for use in the same.

Yet another object of the present invention is to provide a digital broadcast terminal for mapping different-language EPG data to each other, and a roaming method for use in the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for roaming with an Electronic Program Guide (EPG) comprises the steps of: a) receiving Electronic Program Guide (EPG) data; b) determining whether a schema of the received EPG data satisfies a specific condition capable of being processed by a broadcast terminal; and c) if the schema of the EPG data does not satisfy the specific condition, converting current schema data into another schema data capable of being processed by the broadcast terminal using a metadata interface for conversion of the EPG.

Preferably, the specific condition capable of being processed by the broadcast terminal is executed when a schema structure of the received EPG data is different from that of pre-stored EPG data. Preferably, the specific condition capable of being processed by the broadcast terminal is executed when language of the received EPG data is different from that of pre-stored EPG data, Preferably, the metadata interface for the EPG conversion is received from an EPG mapping service provider over a mobile communication network. Preferably, the metadata interface for the EPG conversion is received from an EPG mapping service provider over an Internet.

Preferably, the broadcast data received from the broadcast transmitter has a Digital Multimedia Broadcasting (DMB) standard.

Preferably, the DMB may be a S-DMB or a T-DMB.

In another aspect of the present invention, there is provided a mobile communication terminal equipped with an Electronic Program Guide (EPG) roaming function comprising: a Radio Frequency (RF) receiver for receiving information of a metadata interface for EPG conversion from an EPG mapping service provider, and receiving EPG data from a broadcast transmitter; a memory for storing the information of the metadata interface for the EPG conversion; and a controller for analyzing the received EPG data, and converting the EPG data into a schema of a roaming region using the metadata interface for the EPG conversion as necessary.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
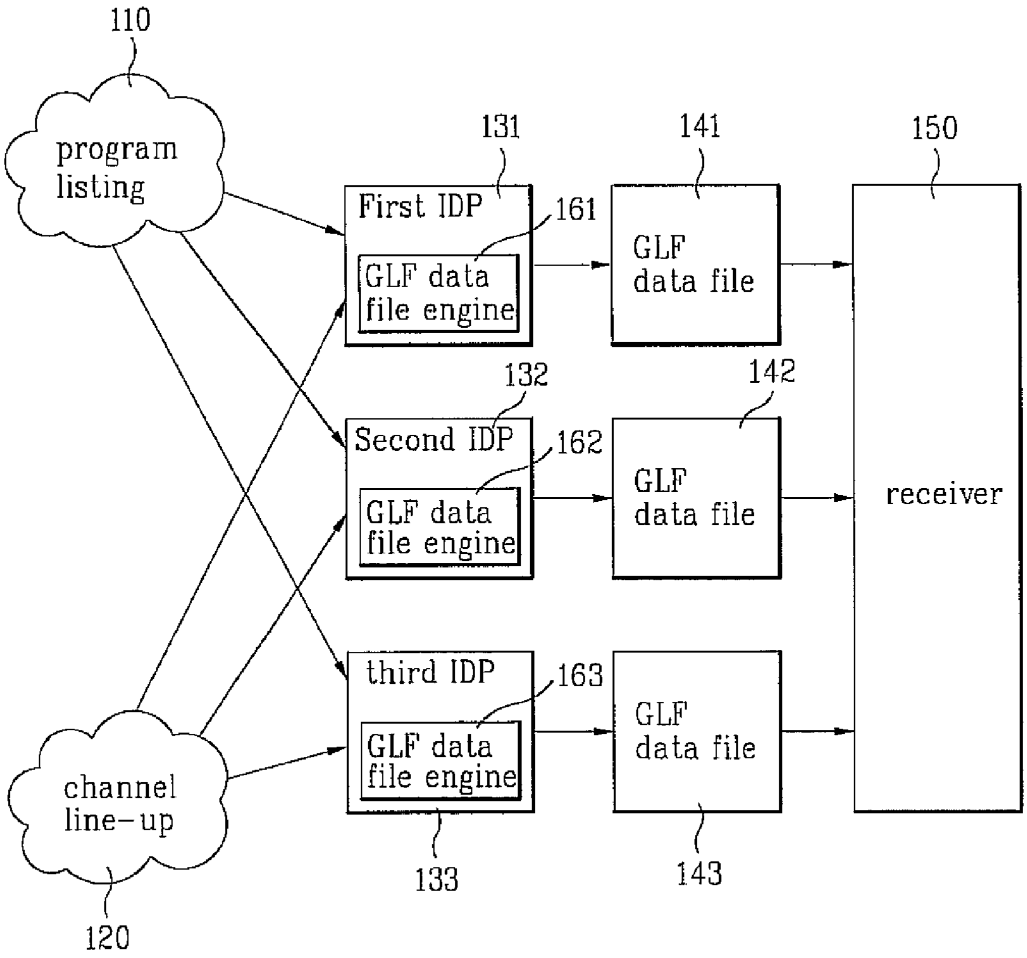
FIG. 1 is a block diagram illustrating a conventional EPG roaming method.

FIG. 1 is a block diagram illustrating a roaming process of EPG data.

Referring to FIG. 1, a single global listing format (GLF) for individual businesses, countries, and regions is defined. Each independent data provider (IDP) 131, 132, or 133 selects programming content data from a relatively-unlimited program listing unit 110, and generates a data file capable of being transmitted to a receiver 150. For this purpose, the IDPs 131, 132, and 133 include GLF data file engines 161, 162, and 163, respectively. The GLF data file engines 161, 162, and 163 are used, respectively, to transmit the converted GLF data files 141, 142, and 143 to the receiver 150. The GLF data files 161, 162, and 163 include substantially complete programming information having no error irrespective of the creation of the programming data file. Further, the channel line-up unit 120 is actually operated at a predetermined place associated with the received programming content data.

The EPG data is converted into a GLF data file format via a GLF conversion engine, and is then transmitted to a destination. The receiver employs the EPG data by parsing a corresponding channel list. The disadvantage(s) associated with this is that all the countries, regions, and businesses need to configure the EPG data using the same GLF metadata format.

Because all the countries, regions, and businesses throughout the world use independent EPG data schemas, it is difficult for an integrated GLF to be applied uniformly to the countries, regions, and businesses for the reasons such as difference in service schemes, business schemes, techniques, and channel environments.

Another possible disadvantage is that the application of the GLF data format may experience waste of process and channel resources. More specifically, all EPG data is processed with additional steps for the GLF conversion engine prior to its transmission. In addition, a plurality of data units having different structures must be converted into single GLF format data, and the single GLF format data must be transmitted over different channels. If not, the single GLF format data must be configured to form a huge integrated data and must be transmitted to a destination over a single channel. In other words, although the system discussed above can integrate different structures into a single structure to implement the global roaming service, it has a disadvantage in that an amount of data to be transmitted unavoidably increases by the number of different structures.

Figure 2:
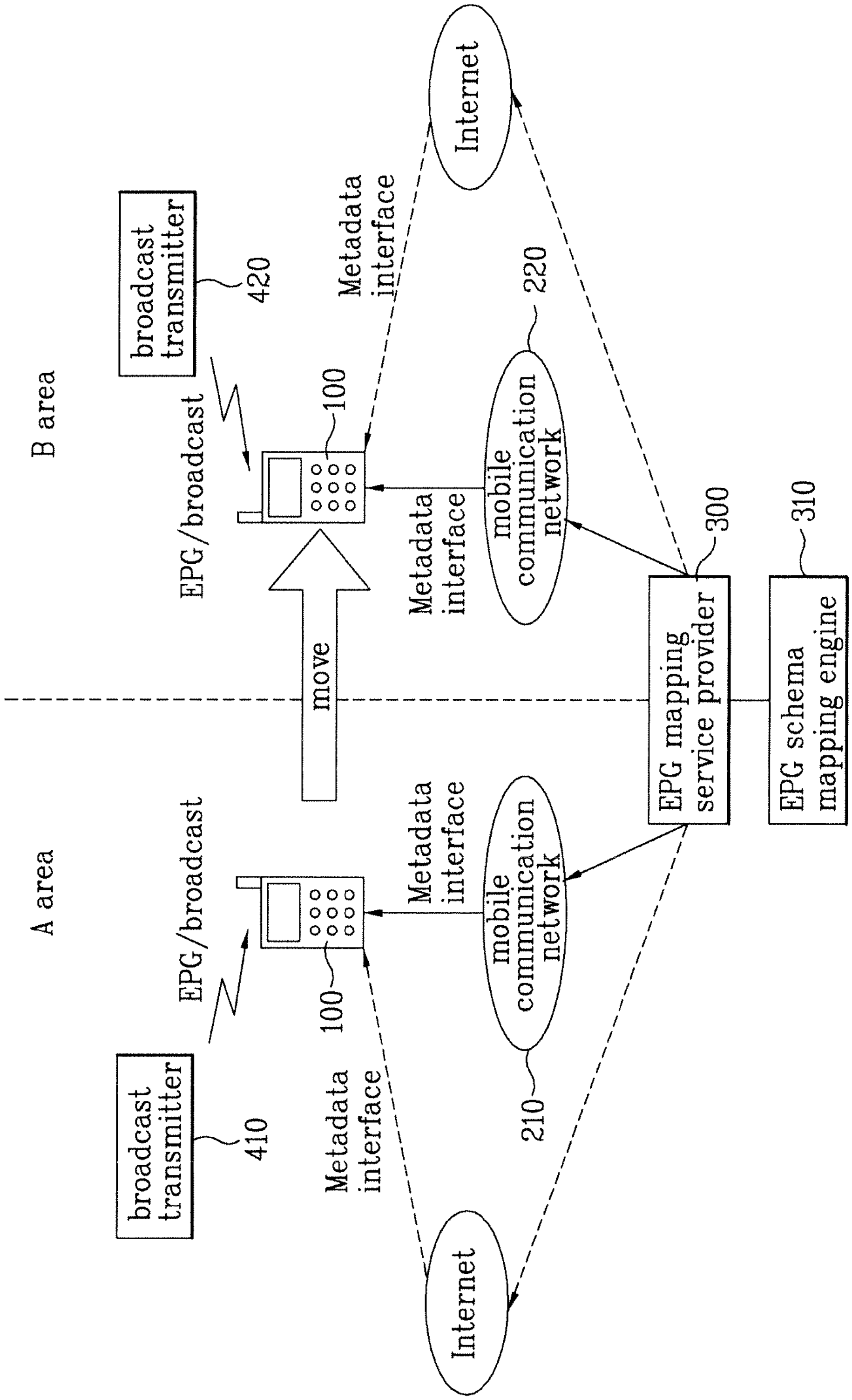
FIG. 2 is a conceptual diagram illustrating an EPG roaming system according to the present invention.

FIG. 2 is a conceptual diagram illustrating an EPG roaming system according to an embodiment of the present invention.

Referring to FIG. 2, a broadcast terminal 100 capable of receiving broadcast data may move from area “A” to area “B”. Here, area “A” and area “B” are different service areas. In this case, a schema structure of EPG data of a broadcast transmitter 410 of area “A” may be different from a schema structure of EPG data of a broadcast transmitter 420 of area “B”. Therefore, in order to allow a user to use the broadcast terminal 100 in area “B”, the schema structure of the broadcast terminal 100 must be properly converted into the schema structure suitable for area “B”. To this end, a metadata interface is required for converting the current schema structure into another schema structure. Information of the metadata interface is received from the EPG mapping service provider 300 over a mobile communication network 210 or 220.

Although FIG. 2 has exemplarily disclosed that the metadata interface information is received over the mobile communication network, it should be noted that a broadcast terminal capable of accessing the Internet may receive the metadata interface information over the Internet. Further, the EPG mapping service provider 300 includes an EPG schema mapping engine 310. EPG schemas of individual regions can be created as the metadata interface information via the schema mapping engine 310.

Figure 3:
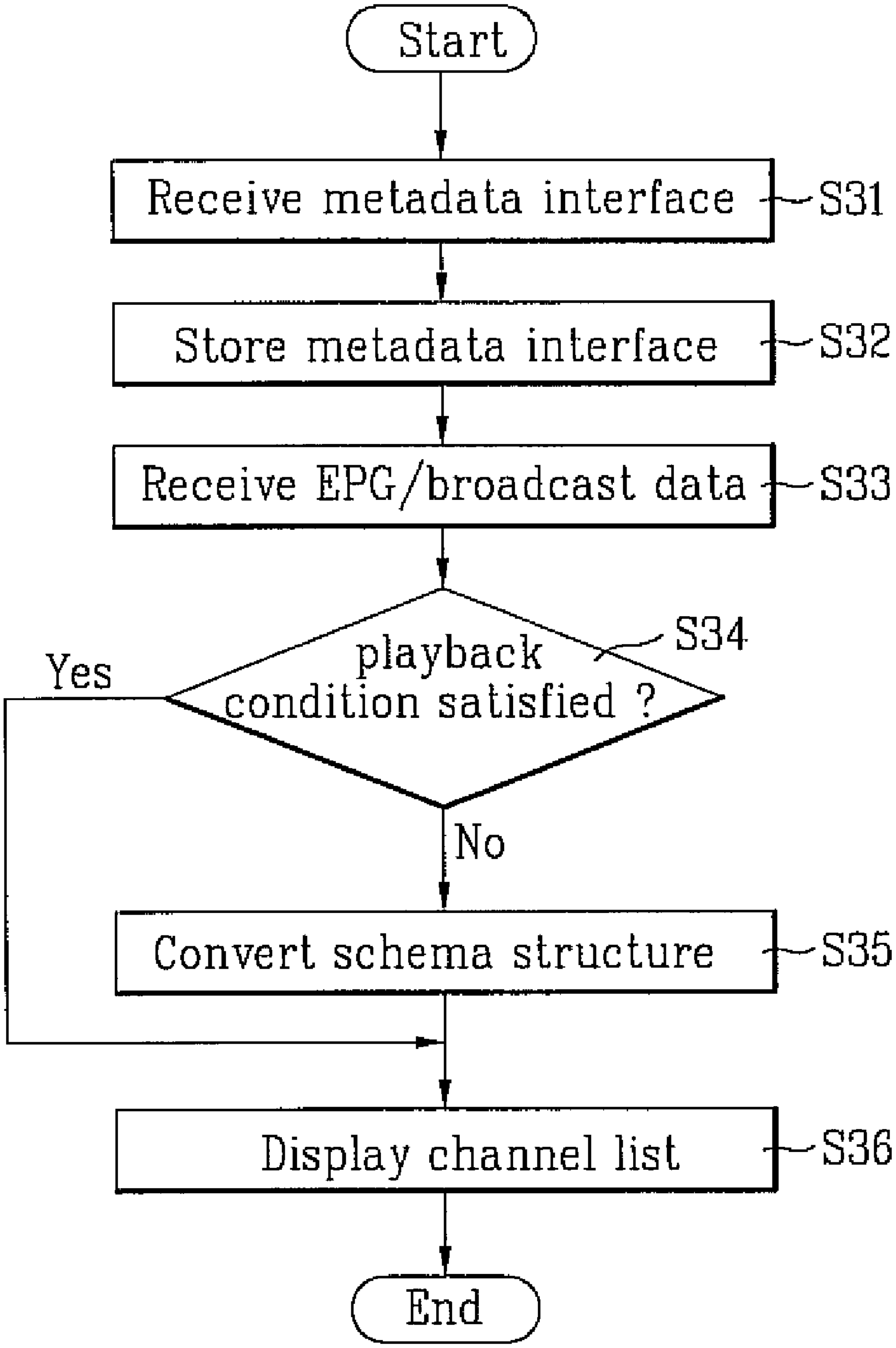
FIG. 3 is a flow chart illustrating an EPG roaming method according to the present invention.

FIG. 3 is a flowchart illustrating an EPG roaming method according to the present invention.

Referring to FIG. 3, if roaming service is provided from area "A", having a first EPG schema structure, to area "B", having a second EPG schema structure, as shown in FIG. 2, the broadcast terminal receives information of the metadata interface from the EPG mapping service provider (S31). Thereafter, the broadcast terminal stores the received metadata interface information in an internal memory (S32). Here, the metadata is indicative of specific data for describing AV content data of broadcast programs.

If the broadcast terminal 100 moves from area "A" to area "B", it receives broadcast data and EPG data from the broadcast transmitter 420 of area "B" (S33).

A controller contained in the broadcast terminal determines whether the received EPG data satisfies a predetermined playback condition (S34).

If it is determined that the received EPG data does not satisfy the predetermined playback condition at step S34, that is, if the schema or language of the received EPG data is different from that of the original EPG data of area "A" at step S34, the controller reads the downloaded metadata interface information stored in the broadcast terminal. Thereafter, the controller uses the metadata interface information read from the memory to convert the schema of the EPG data into another schema that is capable of being processed by the broadcast terminal located in area "B" (S35).

Alternatively, if the received EPG data satisfies the predetermined playback condition at step S34, then the channel list can be displayed bypassing step S35.

The metadata schema, as discussed, indicates a specific format capable of including meaning of schema structures of individual regions. The metadata schemas having the same meanings are mapped to each other irrespective of their structures and languages. The metadata schemas are mapped to each other according to the same meaning structures, instead of the same word structures, such that different languages can be mapped to each other.

Further, different from the conventional art, the EPG data is neither converted to another EPG data prior to the transmission of EPG data nor an amount of the EPG data changed to another amount prior to the transmission of EPG data. If the metadata interface is mapped (e.g., mapped to another area), there is no need to re-map or change the configuration of the mapped metadata interface unless there is change to each schema (S35).

Lastly, the broadcast terminal provides the channel list information that can be recognized by a user by using the converted EPG data (S36).

Figure 4:
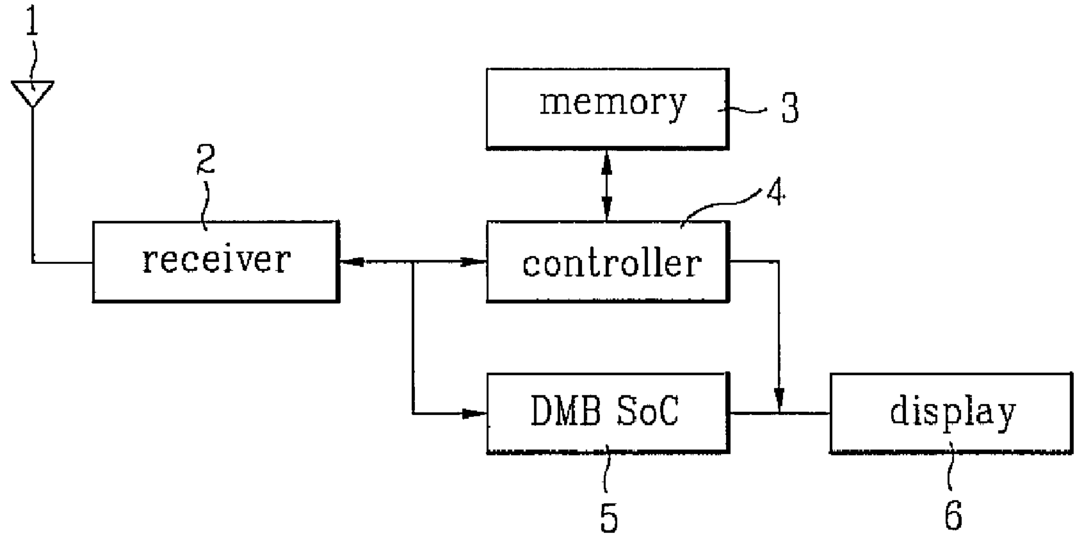
FIG. 4 is a block diagram illustrating a digital broadcast terminal equipped with an EPG roaming function according to the present invention.

FIG. 4 is a block diagram illustrating a digital broadcast terminal equipped with an EPG roaming function according to the present invention.

Referring to FIG. 4, the digital broadcast terminal includes a Radio Frequency (RF) receiver 2, a memory 3, and a controller 4, and a DMB SoC (Digital Multimedia Broadcasting System on Chip) 5.

The RF receiver 2 receives the metadata interface for EPG conversion from the EPG mapping service provider, and receives EPG data from the broadcast transmitter via an antenna 1. The memory 3 stores information of a metadata interface for EPG conversion. If the received EPG data does not satisfy a condition capable of being processed by the broadcast terminal, the controller 4 converts current scheme data into another scheme data, which is capable of being processed by the broadcast terminal, by using the metadata interface for the EPG conversion. The DMB SoC 5 displays the broadcast data received from the RF receiver 2 on the display 6.

Figure 5:
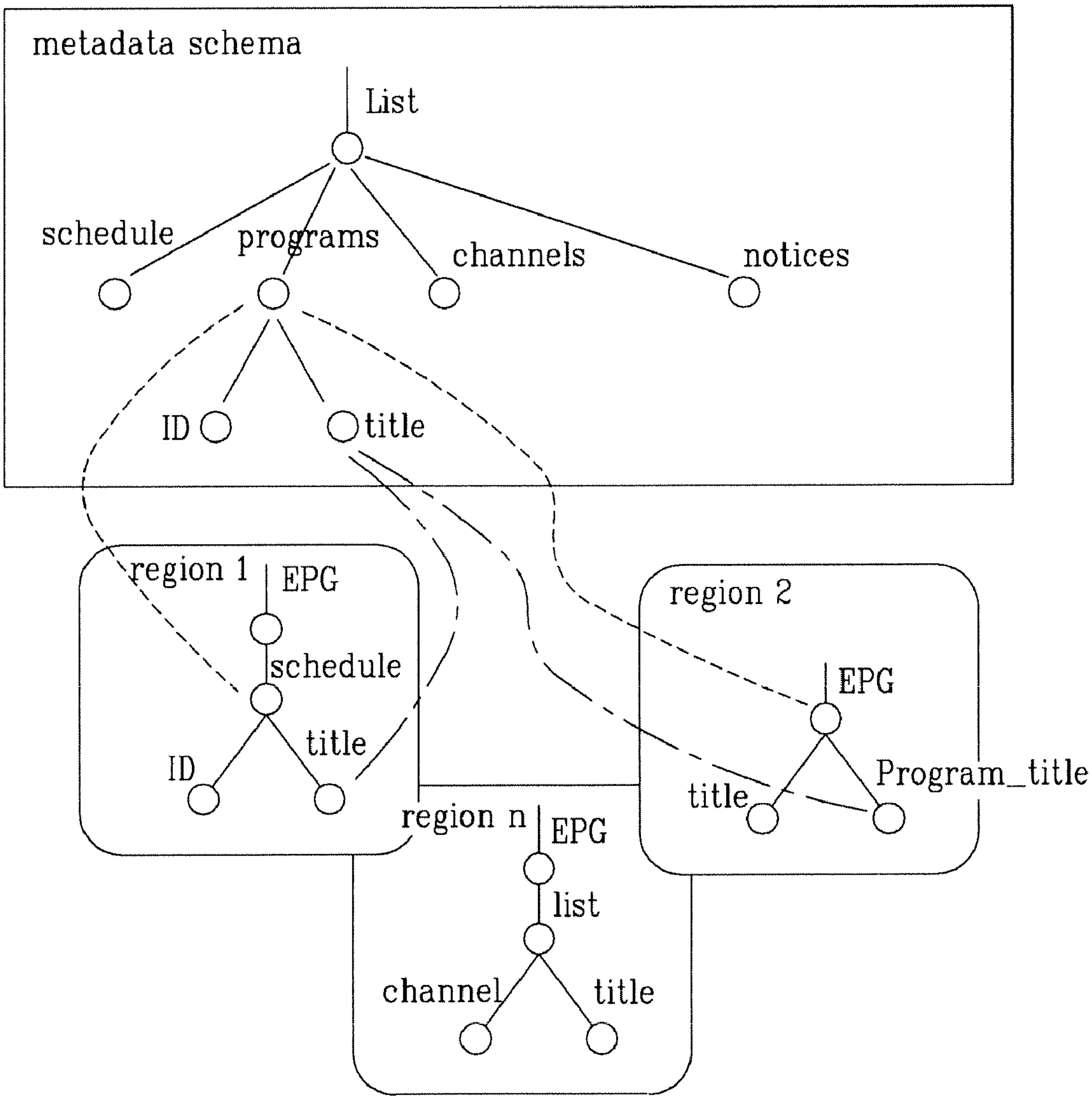
FIG. 5 is a conceptual diagram illustrating an exemplary conversion of a metadata schema structure according to the present invention.

FIG. 5 is a conceptual diagram illustrating an exemplary conversion of a metadata schema structure according to the present invention. Assume that the metadata schema includes, inter alia, the "programs" item, and further includes the "ID" and "title" sub-items under the "program" item. The metadata can further include "schedule", "channels", and "notices" items on the same level as "programs", each of which can include other sub-items such as "ID" and "title".

For example, the EPG in a first region can include the "ID" and "title" sub-items under the "schedule" item, and EPG in a second region can include the "time" and "program_title" sub-items. Here, even if two schema structures are different, the first region having the "schedule" item while the second region not having any item at the same level, the contents or information of the sub-items can be shared or converted to fit the different region's schema structure. In other words, despite the structural difference between regions, such as the "title" sub-item and the "program_title" sub-item of the second region being located at different positions than the "ID" sub-item and the "title" sub-item of the first region, they are considered to be in same level, conceptually. As such, the metadata interface can convert a schema structure of the EPG of the second region into a schema structure capable of being processed by the broadcast terminal in the first region regardless of the structural difference.

As apparent from the above description, a digital broadcast terminal according to the present invention can implement the global roaming service in an EPG data environment based on different schemas. In more detail, the digital broadcast terminal can perform the roaming service under different EPG environments based on regions, countries, languages, and businesses. Moreover, the metadata mapping method can perform mapping of the meaning structure instead of the word structure, such that different languages having the same meaning can be mapped to each other.

As discussed above, the EPG is one of many broadcast program information in the digital multimedia broadcasting field, and in the present invention, the EPG was used as mere example out of many broadcast program information. As such, the present invention is not limited to the EPG, and can be applied to other types of broadcast program information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for roaming with broadcast program information in a broadcast terminal relocating from a first region to a second region, the method comprising:

receiving, at the broadcast terminal, a metadata interface for a broadcast program information data conversion;

storing the received metadata interface in an internal memory of the broadcast terminal;

receiving, at the broadcast terminal, broadcast data and broadcast program information data, wherein the received broadcast program information data comprises data that corresponds to the second region and is not in a Global Listing Format;

determining, at the broadcast terminal, whether a schema of the received broadcast program information data satisfies a specific condition capable of being processed by the broadcast terminal;

displaying, at the broadcast terminal, the received broadcast data upon determining that the schema of the received broadcast program information data satisfies the specific condition;

reading, at the broadcast terminal, the stored metadata interface upon determining that the schema of the received broadcast program information data does not satisfy the specific condition; and converting, at the broadcast terminal, the schema of the received broadcast program information data into another schema capable of being processed by the broadcast terminal using the read metadata interface, wherein converting the schema of the received broadcast program information data into the another schema comprises mapping a schema structure of the second region to a schema structure of the first region based on meanings of schema of the first region and on meanings of schema of the second region, irrespective of any differences between the schema structure of the first region and the schema structure of the second region.

2. The method according to claim 1, wherein the received metadata interface is indicative of data pre-received in the broadcast terminal.

3. The method according to claim 2, wherein the metadata interface is received over a mobile communication network.

4. The method according to claim 1, wherein the metadata interface is received over the Internet.

5. The method according to claim 1, wherein determining whether the schema of the received broadcast program information data satisfies the specific condition capable of being processed by the broadcast terminal comprises comparing a schema structure of the received broadcast program information data and a schema structure of pre-stored broadcast program information data.

6. The method according to claim 1, wherein determining whether the schema of the received broadcast program information data satisfies the specific condition capable of being processed by the broadcast terminal comprises comparing language of the received broadcast program information data and language of pre-stored broadcast program information data.

7. A mobile communication terminal equipped with a broadcast program information roaming function, the mobile communication terminal comprising:

a Radio Frequency (RF) receiver for receiving a metadata interface upon relocation of the mobile communication terminal from a first region to the second region, the metadata interface being for a broadcast program information data conversion, and for receiving broadcast data and broadcast program information data from a broadcast transmitter, wherein the received broadcast program information data comprises data that corresponds to the second region and is not in a Global Listing Format;

an internal memory for storing the received metadata interface corresponding to the second region; and a controller configured to:

determine whether a schema of the received broadcast program information data satisfies a specific condition capable of being processed by the mobile communication terminal;

display the received broadcast data upon determining that the schema of the received broadcast program information data satisfies the specific condition;

read the stored metadata interface upon determining that the schema of the received broadcast program information data does not satisfy the specific condition; and convert the schema of the received broadcast program information data into another schema capable of being processed by the mobile communication terminal by using the read metadata interface and by mapping a schema structure of the second region to a schema structure of the first region based on meanings of schema of the first region and on meanings of schema of the second region, irrespective of any differences between the schema structure of the first region and the schema structure of the second region.

8. The mobile communication terminal according to claim 7, wherein the controller converts the schema of the received broadcast program information data into the another schema capable of being processed by the terminal when a schema structure of the received broadcast program information data is different from a schema structure of pre-stored broadcast program information data.

9. The mobile communication terminal according to claim 7, wherein the controller converts the schema of the received broadcast program information data into the another schema capable of being processed by the terminal when language of the received broadcast program information data is different from language of pre-stored broadcast program information data.

10. The mobile communication terminal according to claim 7, wherein the metadata interface is received over a mobile communication network.

11. The mobile communication terminal according to claim 7, wherein the metadata interface is received over the Internet.

12. The method according to claim 1, further comprising:

displaying a channel list when the schema of the received broadcast program information data satisfies the specific condition.

13. The method according to claim 12, wherein the channel list is displayed by using the converted schema of the received broadcast program information data.

14. The method according to claim 1, further comprising:

roaming with the received broadcast program information data.

* * * * *